(12) United States Patent
Ito

(10) Patent No.: US 7,489,886 B2
(45) Date of Patent: Feb. 10, 2009

(54) IMAGE FORMING APPARATUS

(75) Inventor: Sakae Ito, Kitanagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 11/526,589

(22) Filed: Sep. 26, 2006

(65) Prior Publication Data

US 2007/0071492 A1 Mar. 29, 2007

(30) Foreign Application Priority Data

Sep. 26, 2005 (JP) ............................. 2005-278229

(51) Int. Cl.
*G03G 15/00* (2006.01)
(52) U.S. Cl. ...................... 399/107; 399/108; 399/109; 399/110
(58) Field of Classification Search ................ 399/107, 399/108, 110, 118, 109, 125
See application file for complete search history.

(56) References Cited

U.S. PATENT DOCUMENTS

| 6,741,820 B2 * | 5/2004 | Nobe et al. ................. 399/110 |
| 7,107,004 B2 * | 9/2006 | Saito ........................... 399/405 |

| 2004/0228650 A1 | 11/2004 | Saito |
| 2004/0247337 A1 | 12/2004 | Ohama et al. |

FOREIGN PATENT DOCUMENTS

| CN | 2632726 | 8/2004 |
| JP | 2004-214803 | 7/2004 |

OTHER PUBLICATIONS

English translation JPO pub # 2004-214803.*
CN Office Action dtd May 30, 2008, CN App 2006101413929.

* cited by examiner

*Primary Examiner*—David M Gray
*Assistant Examiner*—Geoffrey T Evans
(74) *Attorney, Agent, or Firm*—Banner & Witcoff, Ltd.

(57) ABSTRACT

An image forming apparatus includes: an image forming unit that forms an image on a recording medium; an image reading unit that reads the image entered on an original and is disposed upwardly of the image forming unit; a joint member that connects the image forming unit and the image reading unit, the joint member including a first recess depressed toward a space formed between the image forming unit and the image reading unit; and a cover member including: a lower side fixed to the image forming unit; an upper side extending toward the image reading unit for covering the first recess; and a second recess depressed toward the first recess so as to follow the shape of the first recess.

9 Claims, 9 Drawing Sheets

IMAGE FORMING APPARATUS

CROSS-REFERENCE TO THE RELATED APPLICATION(S)

This application is based upon and claims priority from prior Japanese Patent Application No. 2005-278229 filed on Sep. 26, 2005, the entire contents of which are incorporated herein by reference.

TECHNICAL FIELD

Aspects of the present invention relates to an image forming apparatus in which an image reading unit is disposed upwardly of an image forming unit.

BACKGROUND

Referring to a conventional image forming apparatus in which an image reading unit is disposed upwardly of an image forming unit. For example, according to JP-A-2004-214803, an image forming unit and an image reading unit are connected together by a joint cover. In the joint cover, there is provided a grip portion (a hold portion) for carrying the image forming apparatus.

SUMMARY

In JP-A-2004-214803, part of the joint cover is depressed inwardly to thereby form a grip portion. However, when the mechanical strength of the grip portion is low, there is a possibility that the grip portion can be flexed and the resultant strain of the grip portion can have an ill influence on the image reading unit.

In view of the above problem found in the JP-A-2004-214803, aspects of the invention provide the image forming apparatus that can prevent the possibility that the grip portion can be flexed and the resultant strain of the grip portion can have an ill influence on the image reading unit.

According to an aspect of the invention, there is provided an image forming apparatus including: an image forming unit that forms an image on a recording medium; an image reading unit that reads the image entered on an original and is disposed upwardly of the image forming unit; a joint member that connects the image forming unit and the image reading unit, the joint member including a first recess depressed toward a space formed between the image forming unit and the image reading unit; and a cover member including: a lower side fixed to the image forming unit; an upper side extending toward the image reading unit for covering the first recess; and a second recess depressed toward the first recess so as to follow the shape of the first recess.

DETAILED DESCRIPTION

Figure 1:
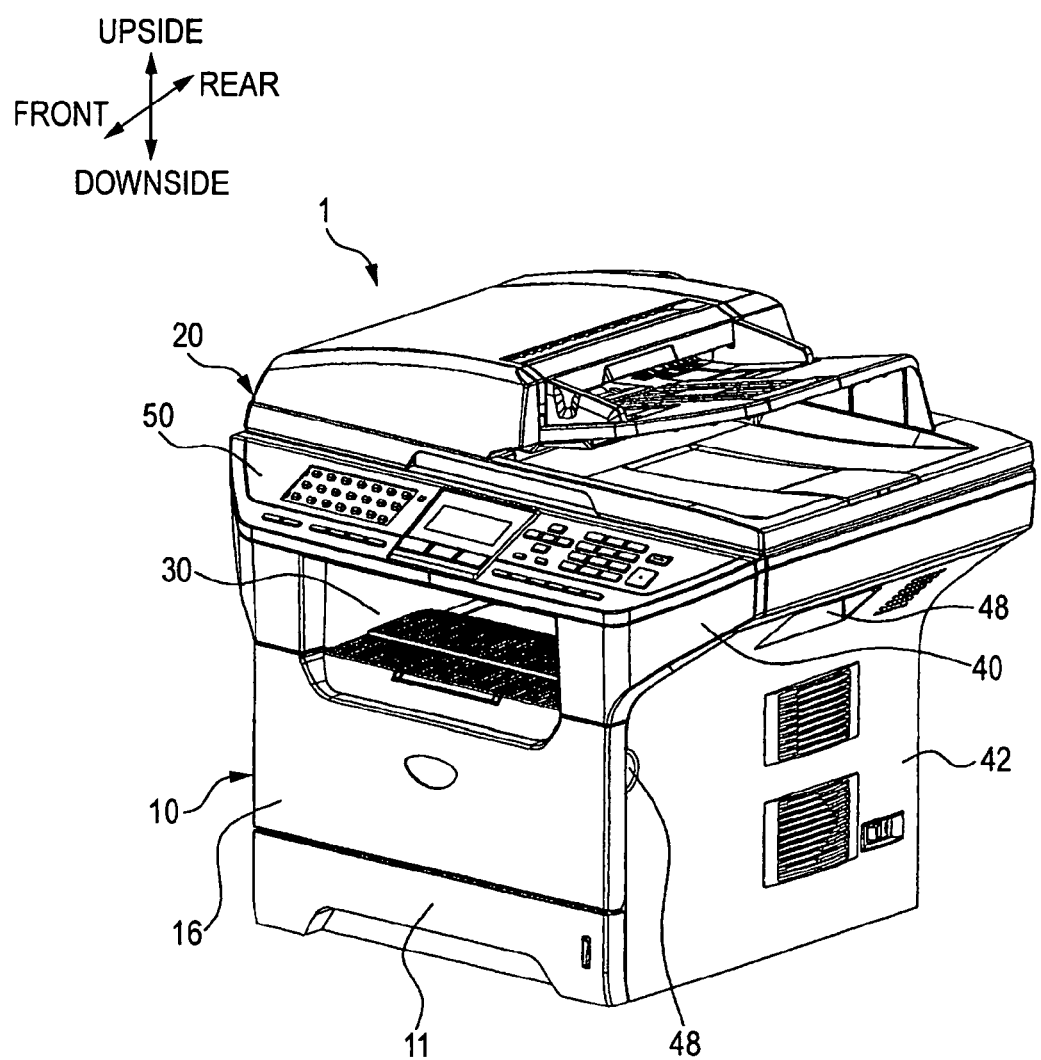
FIG. 1 is a perspective view of a front surface side appearance of an image forming apparatus according to one aspect of the invention.
Figure 2:
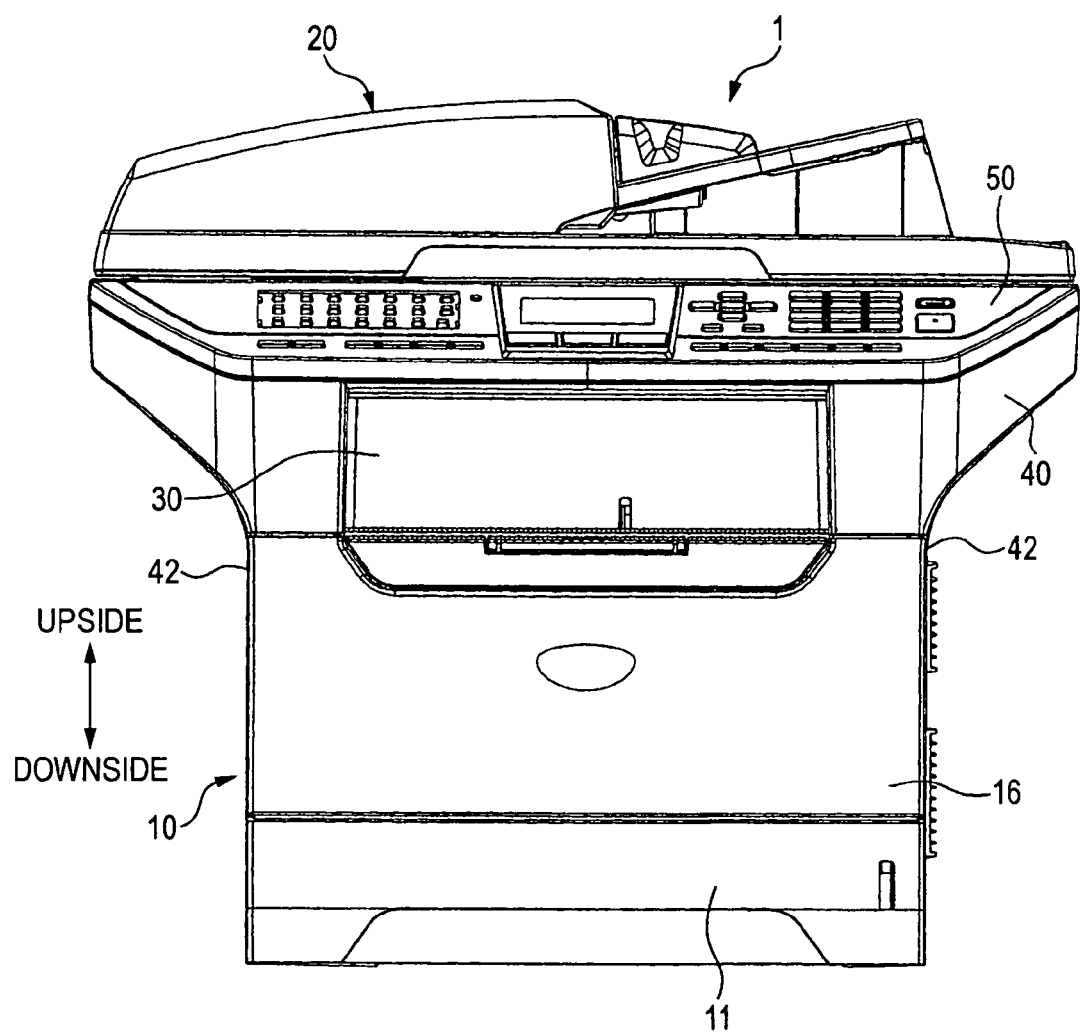
FIG. 2 is a front view of the image forming apparatus.
Figure 3:
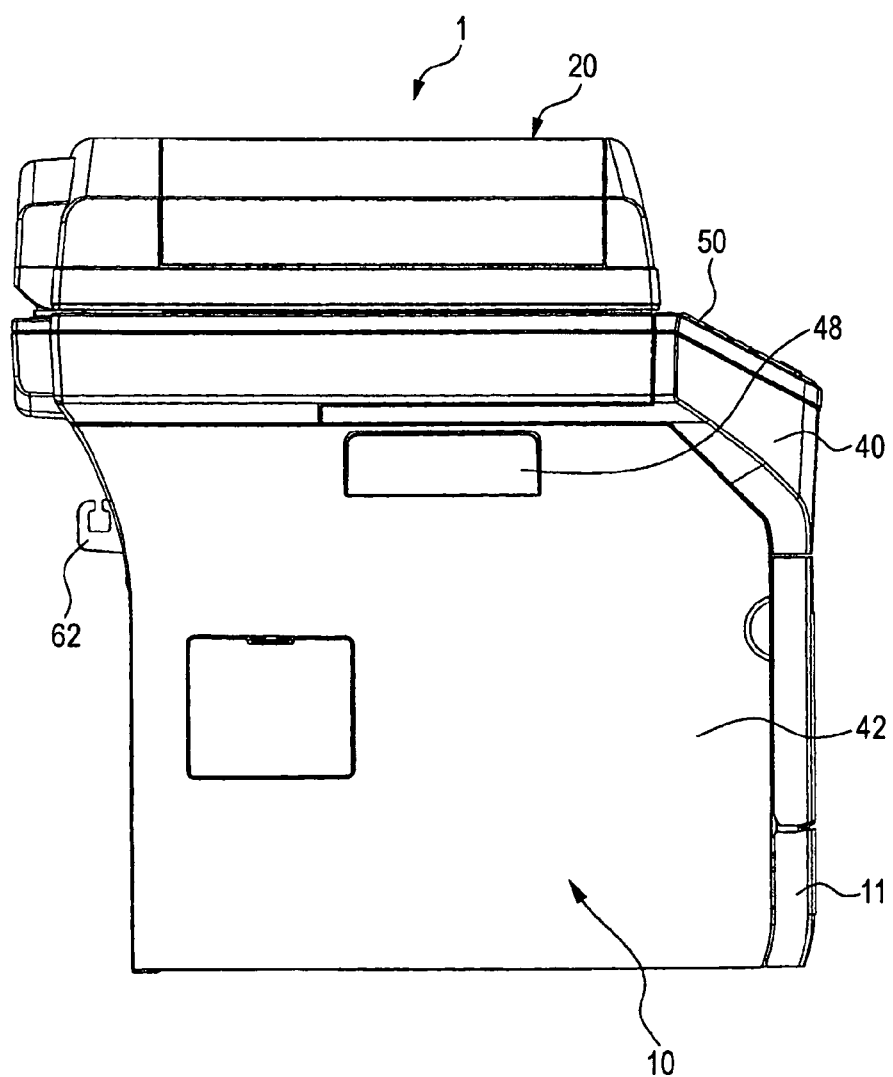
FIG. 3 is a left side view of the image forming apparatus.
Figure 4:
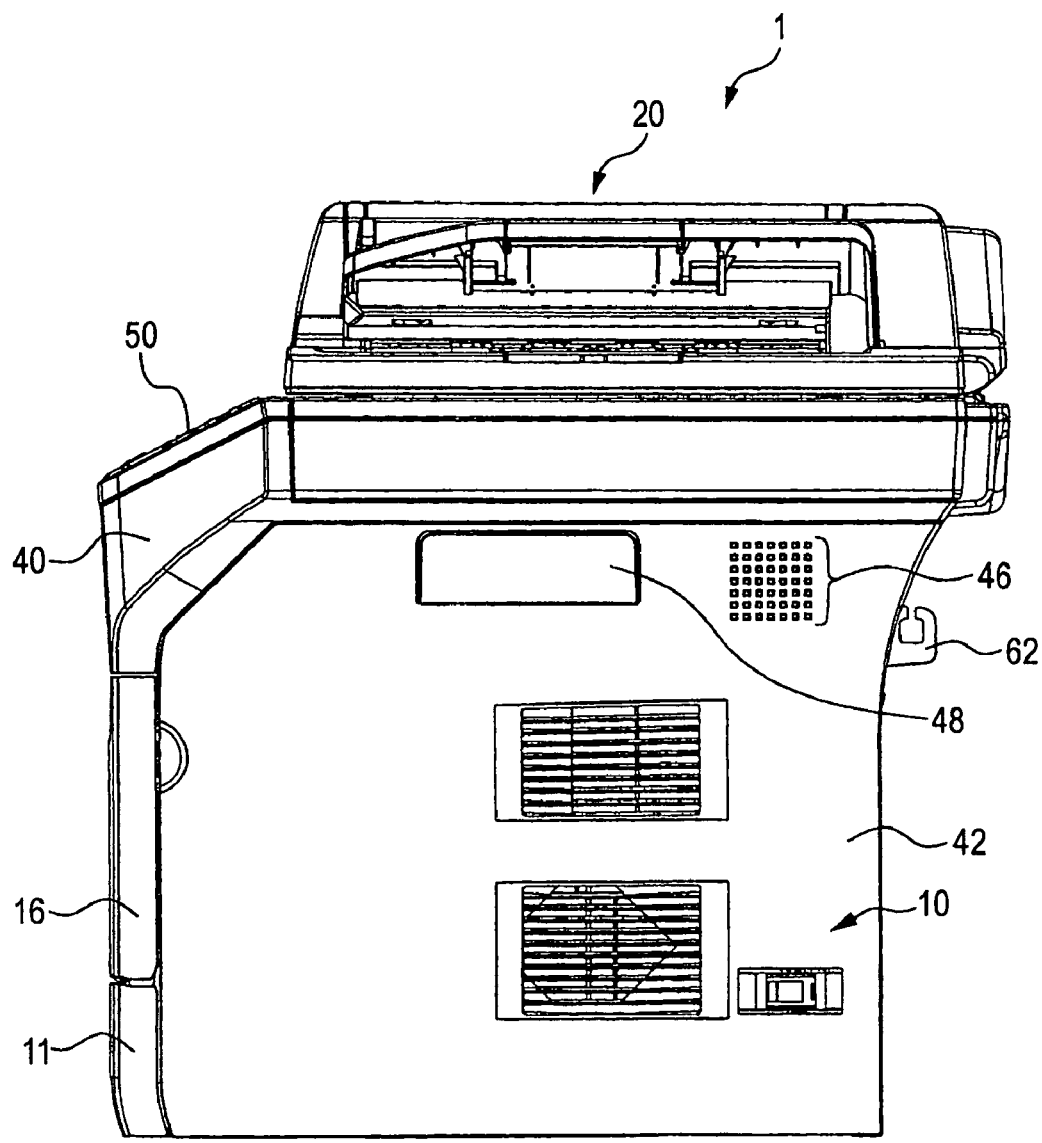
FIG. 4 is a right side view of the image forming apparatus.
Figure 5:
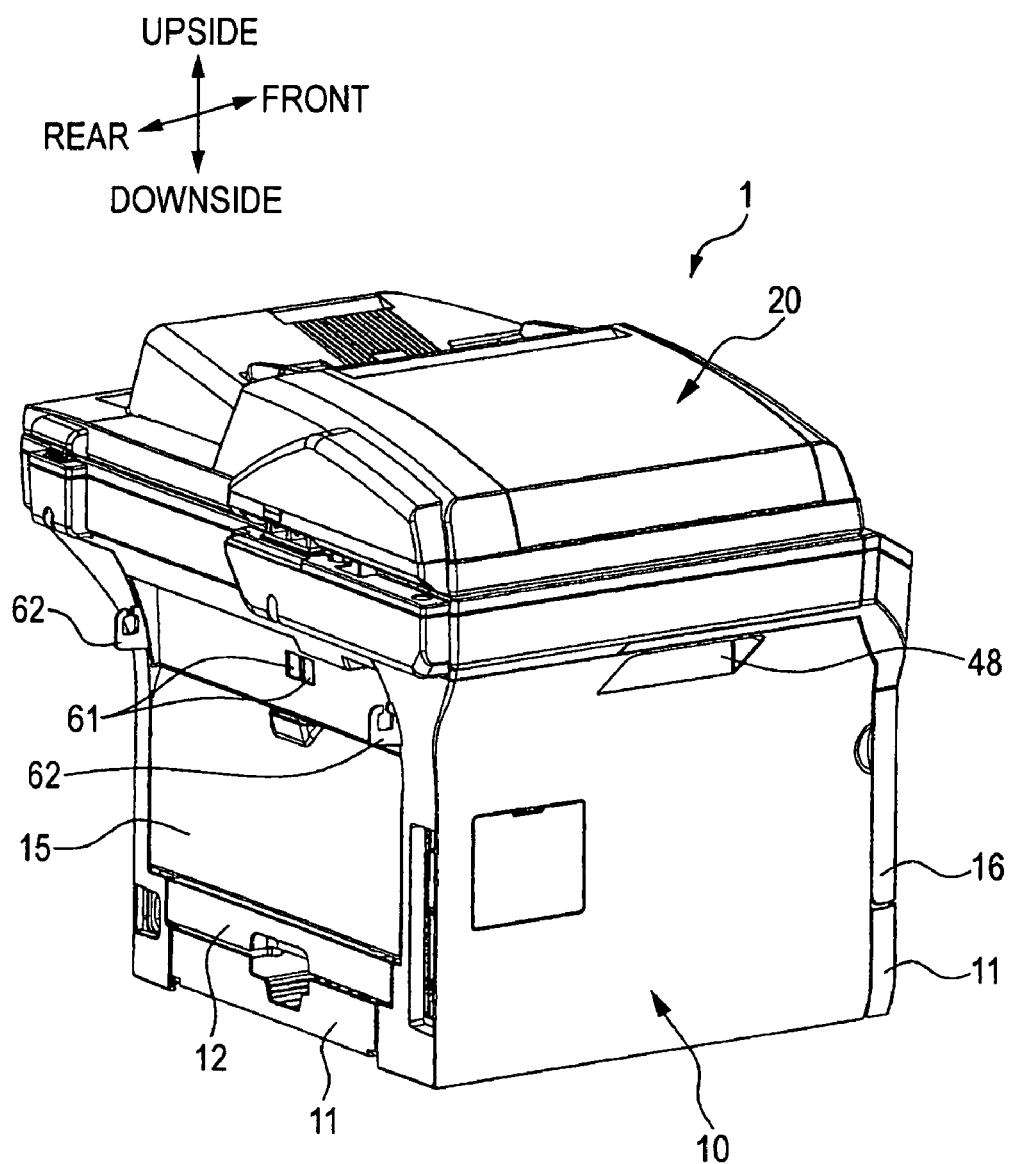
FIG. 5 is a perspective view of a rear side appearance of the image forming apparatus.
Figure 6:
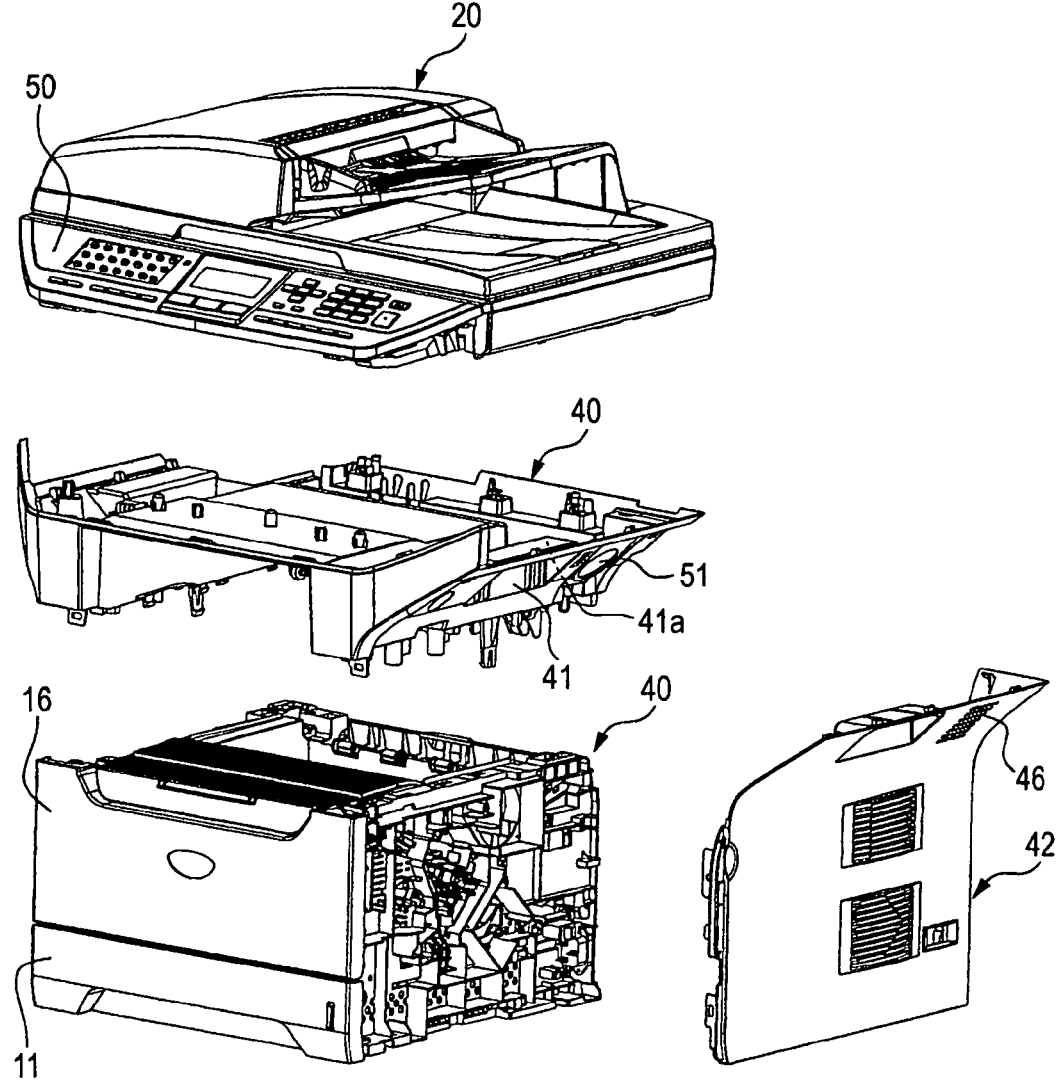
FIG. 6 is an exploded perspective view of the image forming apparatus.
Figure 7:
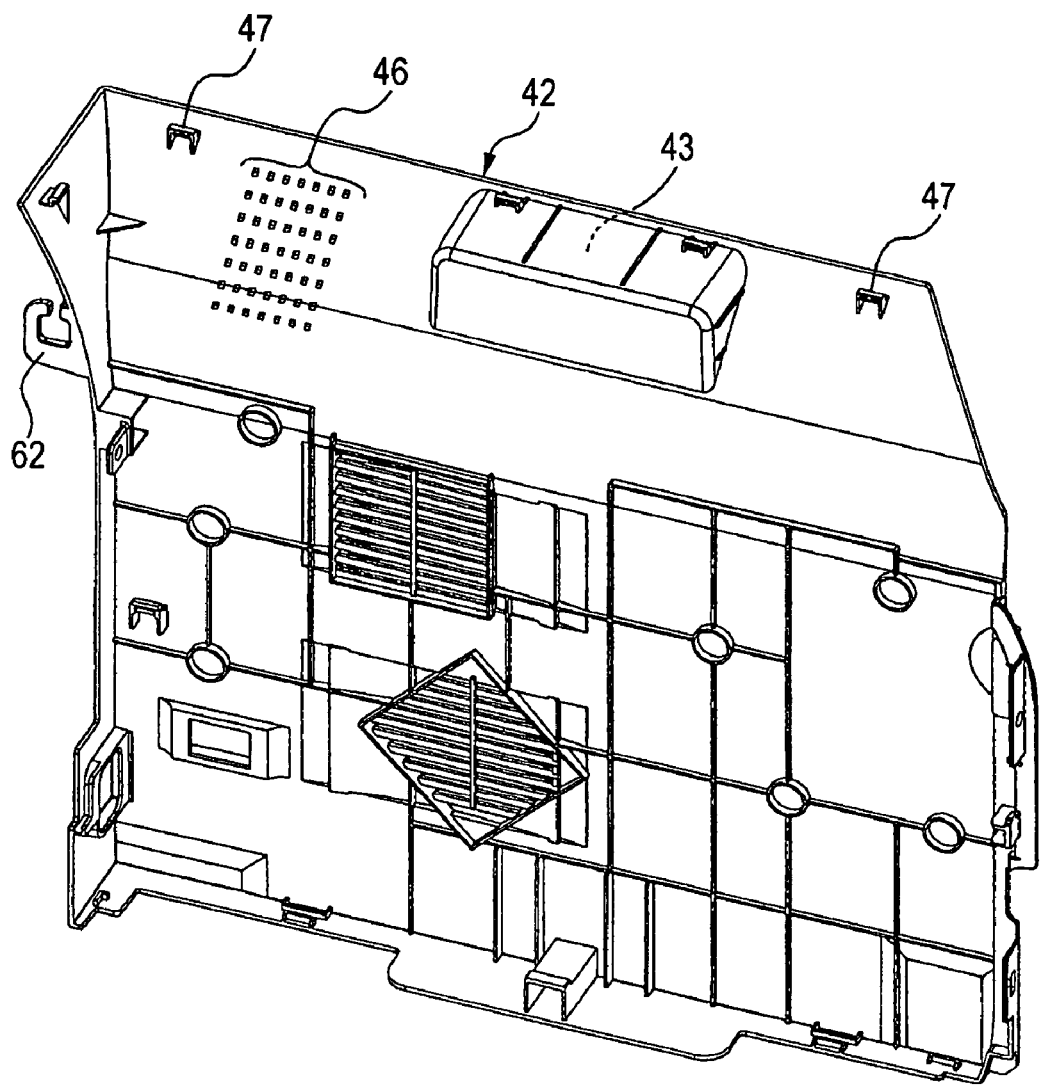
FIG. 7 is a perspective view of a side cover of the image forming apparatus viewed from the rear side thereof.
Figure 8:
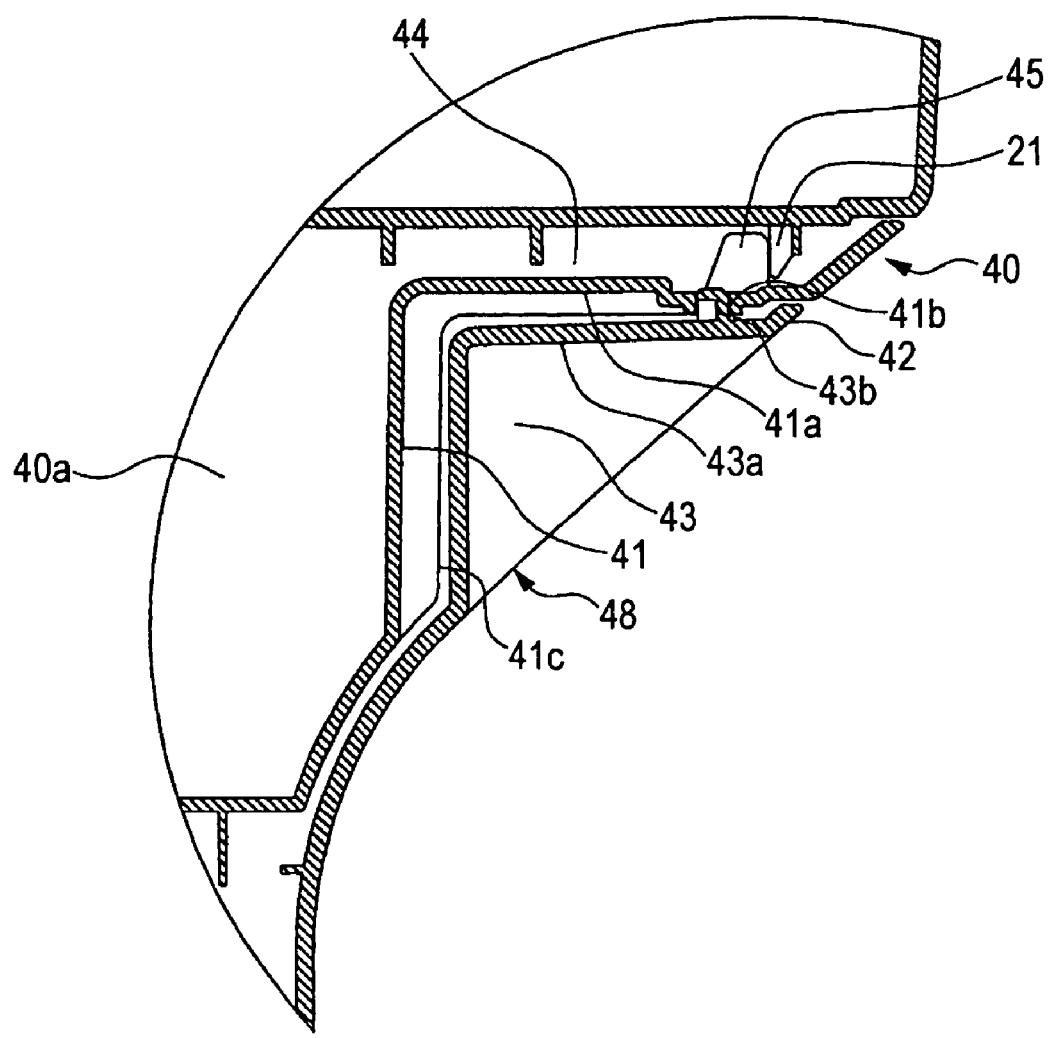
FIG. 8 is a sectional view of a grip portion of the image forming apparatus.
Figure 9:
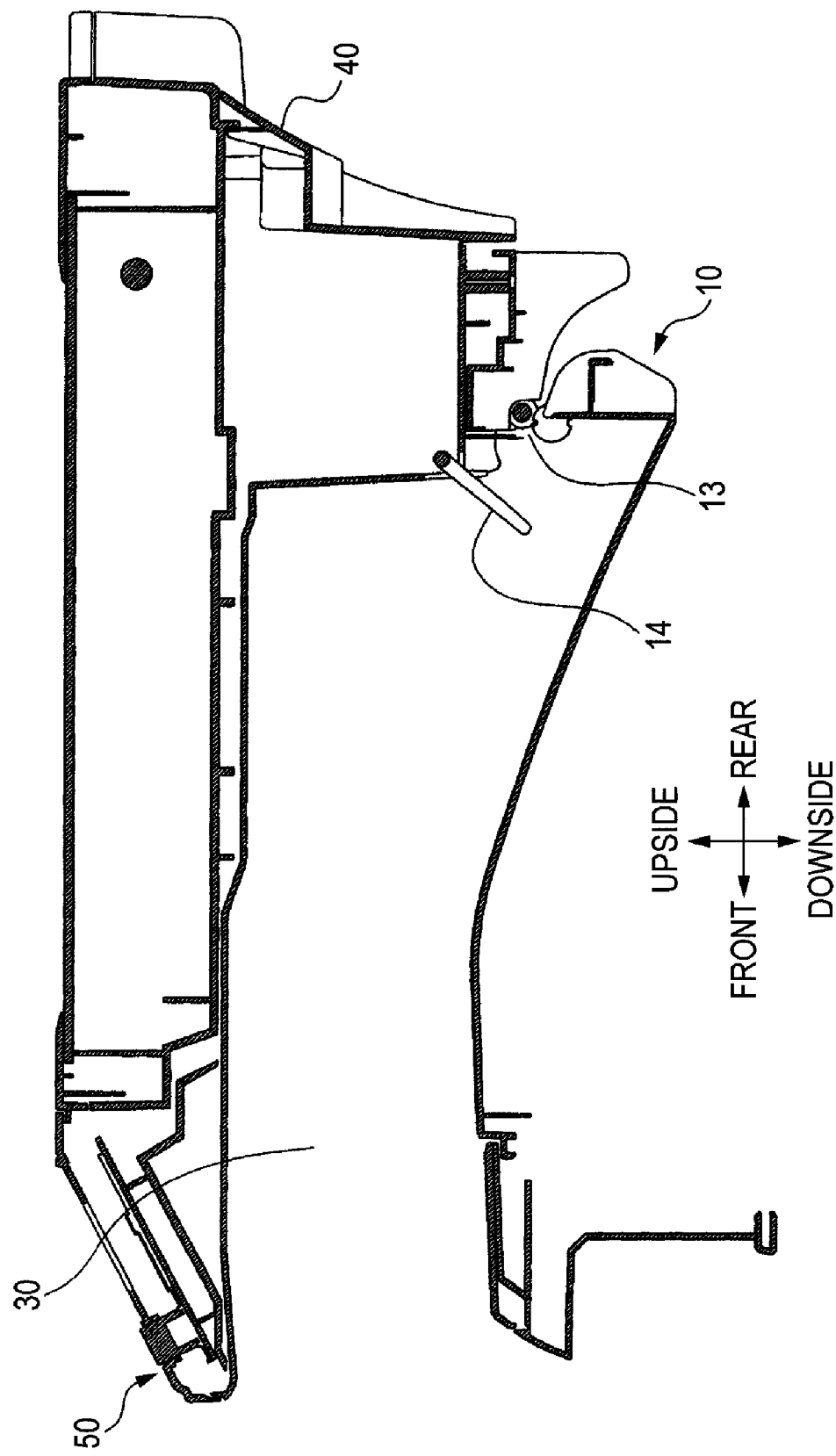
FIG. 9 is a sectional view of a placement space of the image forming apparatus.

FIG. 1 is a perspective view of the front side appearance of an image forming apparatus 1 according to the present aspect. FIG. 2 is a front view of the image forming apparatus 1. FIG. 3 is a left side view of FIG. 2. FIG. 4 is a right side view of FIG. 2. FIG. 5 is a perspective view of the back side appearance of the image forming apparatus 1. FIG. 6 is an exploded perspective view of the image forming apparatus 1 with its main parts taken to pieces. FIG. 7 is a perspective view of a side cover 42 when it is viewed from the back side thereof. FIG. 8 is a section view of a grip portion. FIG. 9 is a section view of a placement space 30.

As shown in FIG. 1, an image forming unit (laser printer) 10 of an electrophotographic type is disposed downwardly of a placement space 30. An image reading unit (scanner) 20, which reads images such as letters entered on an original, is disposed upwardly of the placement space 30. The placement space 30 constitutes a paper discharge tray for placing therein recording on which the image formation is completed in the image forming unit 10.

The image forming unit 10 and the image reading unit 20 are connected together by a joint member 40, which is interposed between the image forming unit 10 and image reading unit 20. The placement space 30 is provided within the joint member 40.

An operation panel 50 used to carry out the setting operations of the image forming unit 10 and image reading unit 20 is disposed on the opening side of the placement space 30. Besides, the opening side of the placement space 30 is an upper side of the placement space 30 of the front side of the image forming apparatus 1. On the other hand, as shown in FIG. 5, a connector unit 61 for mounting a network cable (not shown) and a cable hook 62 for holding a network cable are disposed on the rear side of the image forming apparatus 1. The rear side of the image forming apparatus 1 is the opposite side to the operation panel 50. The network cable connects the image forming apparatus 1 to a computer network. The cable hook 62 is integrally formed with a side cover 42.

The image forming unit 10 is an electrophotographic type printer. The image forming unit 10 delivers a recording medium such as paper or OHP placed in a paper feed tray (see FIG. 1 or FIG. 5) provided on the lower portion of the image forming apparatus 1 to a process cartridge includes a photosensitive drum provided upwardly of the paper feed tray 11 to thereby transfer images onto the recording medium. The image forming unit 10 heats the recording medium with the images transferred thereon using a fixing unit to fix toner to the recording medium, thereby forming the images on the recording medium.

The image forming unit 10 has a function to form (print) images on both of the front and back surfaces of the recording medium. Specifically, the both sides printing function is realized by a reversing mechanism for reversing the delivery direction of the recording medium discharged from the fixing unit and a both sides printing unit 12 for forming a delivery path for delivering the recording medium with its delivery direction reversed back again to the process cartridge (see FIG. 5).

The recording medium placed in the paper feed tray 11 is delivered upwardly while it meanders in such a manner that the delivery direction thereof is turned substantially 180° on the longitudinal direction end portion side of the image forming apparatus 1, and is then discharged into the placement space 30.

The image reading unit 20 includes a stationary original read function for reading images entered on an original stationary set on a reading window (platen) includes a transparent member such as glass, and an automatic delivery and read function for automatically delivering the original to the reading window and reading images entered on the original.

When reading the images, the image reading unit 20 radiates light onto the original placed on the reading window and converts the light reflected by the original to electric signals using an image pickup element such as a CCD (Charge-Coupled Device) or a CIS (Contact Image Sensor) to thereby read the images entered on the original as the electric signals.

The joint member 40 is a connecting member made of resin, which connects together the upper end side of the image forming unit 10 and the lower end side of the image reading unit 20. First recesses 41 are formed on the side wall portion of the joint member 40, which corresponds to the right and left side surfaces of the image forming apparatus 1, as shown in FIG. 8. The first recesses 41 are respectively depressed toward spaces 40a. The spaces 40a are respectively formed between the image forming unit 10 and image reading unit 20.

Each first recess 41 has a wall the section of which is formed in a substantially L-like shape, and this wall forms a substantially triangular prism shape space (see FIG. 6). The entire periphery of a horizontal wall portion 41A extending substantially horizontally is formed integrally continuous with the joint member 40.

In the first recess 41, there is not formed at all such an opening that allows the space 40A side (the inside) and the outside to communicate with each other, but the first recess 41 is integrally formed with the joint member 40 in such a manner that the side wall portion of the joint member 40 is depressed toward the space 40A.

The side surface of the joint member 40, which the first recess is formed, is covered with a resin-made side cover 42 which also acts as a printer cover for covering members stored within the image forming unit 10. The lower side of side cover 42 is fixed to the image forming unit 10 by a mechanical fastening unit such as a screw or a securing projection, whereas the upper side thereof is extended toward the image reading unit 20 and is connected to the joint member 40.

In the side cover 42, there is formed a second recess 43 which is depressed toward the first recess 41 so as to follow the shape of the first recess 41. The second recess 43, similarly to the first recess 41, has a wall the section of which is formed in a substantially L-like shape. The wall forms a substantially triangular prism shape space. The entire periphery of a horizontal wall portion 43A extending substantially horizontally is integrally continuous with the side cover 42.

In other words, in the second recess 43, there is not formed at all such an opening as allows the first recess 41 side to communicate with the outside, but the second recess 43 is formed of resin integrally with the side cover 42 in such a manner that part of the side cover 42 is depressed toward the first recess 41.

In the present aspect, the first recess 41 and second recess 43 are mechanically connected together in such a manner that a securing projection 43B provided on the horizontal wall portion 43A of the second recess 43 is inserted into a securing hole 41B formed in the horizontal wall portion 41A of the first recess 41. And, on the surface of the first recess 41 facing the second recess 43, there is integrally provided a projecting rib 41C which projects toward the second recess 43 and extends so as to follow the L-shaped wall surface.

On the other hand, the horizontal wall portion 41A of the first recess 41 and the image reading unit 20 are separated from each other with a space 44 of a given dimension or larger between them. In the space 44, there are provided positioning projections 45, 21 which are used to decide (fix) the position of the image reading unit 20 with respect to the joint member 40.

As shown in FIG. 9, the joint member 40 configures the ceiling portion of the placement space 30. A portion of the joint member 40, which exists in the vicinity of the recording medium discharge portion 13 of the image forming unit 10, is oscillatably assembled a movable member 14 for a paper discharge full sensor (not shown). The paper discharge full sensor is used to check whether the number of recording mediums discharged to and placed in the placement space 30 reaches a given number or not.

The paper discharge full sensor includes a light emitting element and a light receiving element. An optical path between the light emitting and receiving elements is cut off or opened by using a cut-off plate. The cut-off plate oscillates in conjunction with the movable member 14. Whether the number of recording mediums placed in the placement space 30 reaches a given number or more or not is detected by using the cut-off plate.

As shown in FIG. 6, in the vicinity of the first recess 41 of the joint member 40, there is provided a speaker 51 which generates a given type of sound according to the operation of the operation panel 50 or according to the operation of the image forming apparatus 1. In the portion of the side cover 42 that corresponds to the speaker 51, there are formed a large number of holes 46 which are used to cover the speaker 51 and propagate the sound.

Further, as shown in FIG. 7, on the upper end side of the side cover 42, there are provided securing projections 47 which form a fixing unit for fixing the side cover 42 to the upper end side of the joint member 40. And, as shown in FIG. 1, in the front end side middle portion of the side cover 42, there is formed an inwardly depressed recess 48 which allows an operator to easily put his or her fingers on a door 16 for opening and closing a hand insertion opening.

As shown in FIG. 3 or in FIG. 4, the front surface side of the joint member 40 and the front surface side of the image forming unit 10 are formed flush with each other so as to form a straight line when they are viewed from the lateral side thereof.

In the image forming apparatus 1 according to the present aspect, the first recess 41 and second recess 43 respectively depressed toward the space 40A cooperate together in forming a grip portion 48 (see FIG. 1). Therefore, this grip portion 48 is composed by the joint member 40 and side cover 42 and provides a double structure, which makes it possible to enhance the mechanical strength of the grip portion 48.

Therefore, the grip portion 48 is prevented from being strained greatly. Further, this aspect can prevent the possibility that the grip portion 48 is flexed and the resultant strain of the grip portion 48 has an ill influence on the image reading unit 20.

Also, the entire periphery of the substantially horizontally extending horizontal wall portion 41A is formed integrally continuous with the joint member 40. In the first recess 41, there is not formed an opening as to allow the space 40A side (the inside) and the outside to communicate with each other. Therefore, the mechanical strength of the grip portion 48 (first recess 41) can be enhanced.

On the surface of the first recess 41 facing the second recess 43, there is integrally provided the projecting rib 41C which projects toward the second recess 43 and extends along the L-shaped wall surface. This can enhance the mechanical strength of the first recess 41 further.

Since the projecting rib 41C is covered with the second recess 43 (side cover 42), there is no possibility that the projecting rib 41C can appear in the grip portion 48. This not only can prevent the projecting rib 41C from touching the hands of an operator when the operator grips the grip portion 48 but also can enhance the mechanical strength of the grip portion 48 (first recess 41) while preventing the impaired appearance (design) of the grip portion 48.

Further, because the first and second recesses 41 and 43 are connected together, the first and second recesses 41 and 43 are going to deform integrally when a load is applied to the grip portion 48. This not only can enhance the deformation strength of them with respect to the load but also can prevent the second recess 43 from shifting with respect to the first recess 41. Therefore, when a load is applied to the grip portion 48 and the grip portion 48 is thereby strained, it is possible to prevent a possibility that the first and second recesses 41 and 43 can rub against each other to thereby generate unpleasant strange noises.

Since the horizontal wall portion 41A side of the first recess 41 is separated from the image reading unit 20 with the space 44 between them, even when the grip portion 48 (first and second recesses 41 and 43) are strained in such a manner that they are moved toward the image reading unit 20, the first recess 41 can be prevented from touching the image reading unit 20. Therefore, it is possible to positively eliminate a possibility that the grip portion 48 can be flexed and the resultant strain of the grip portion 48 can have an ill influence on the image reading unit 20.

Because the side cover 42 also serves as a printer cover for covering members stored within the image forming unit 10, there can be eliminated the need for provision of a special part which is used to constitute the second recess 43. Therefore, it is possible to reduce the number of parts of the image forming apparatus 1. Further, the image forming unit 10 can be connected to the image reading unit 20 by the side cover 42, which is an integral body with no juncture therein.

This not only can connect together the image forming unit 10 and image reading unit 20 strongly but also can provide an appearance which is excellent in design.

The cable hook 62 is disposed at a higher position than the opening/closing door 15 and outwardly of the width direction of the opening/closing door 15. Therefore, if a network cable is secured to the cable hook 62, when the opening/closing door 15 (see FIG. 5) of the image forming unit 10 is opened in order to remove the recording mediums jammed within the image forming unit 10, the network cable can be prevented from interfering with the opening/closing door 15.

Since there is employed a structure in which the speaker 51 is provided on the joint member 40 and it is covered with the side cover 42, there can be eliminated the need for provision of a member which is used to fix the speaker 51 to the side cover 42.

Therefore, even when the side cover 42 is formed by resin molding, there is no possibility that sink marks can appear on the external appearance of the side cover 42 and also, in assembly, there is no possibility that the cable of the speaker 51 can be sandwiched by the side cover 42.

In the present aspect, the side cover 42 is corresponding to the cover member, while the securing holes 41B and securing projections 43B correspond to a connecting unit.

In the aspect, the image forming unit 10 is an image forming device of an electrophotographic type. However, the invention is not limited to this, but it may also be an image forming device of an ink jet type.

Further, in the aspect, by inserting the securing projections 43B provided on the horizontal wall portion 43A of the second recess 43 into the securing holes 41B formed in the horizontal wall portion 41A of the first recess 41, the joint member 40 and side cover 42 are mechanically connected together. However, the invention is not limited to this, but, for example, securing projections may be provided on the horizontal wall portion 41A of the first recess 41 and securing holes may be formed in the horizontal wall portion 43A of the second recess 43.

Further, in the aspect, the image forming unit 10 has a both sides printing function. However, the invention is not limited to this.

Moreover, the aspect has both of a stationary original read function and an automatic delivery and read function. However, the invention is not limited to this.

It should be noted that the above-described aspect is merely an example of the invention, and it goes without saying that the aspect can be modified appropriately within the scope which does not change the gist of the invention.

According to the above aspects, there is provided a shape in which the horizontal wall portion 41A and joint member 40 are connected firmly. This makes it possible to further enhance the mechanical strength of the grip portion (first recess 41).

According to the above aspects, since the first and second recesses 41 and 43 can be deformed as an integral body when a load is applied to the grip portion, the deformation strength of the grip portion against the load can be enhanced further.

Further, owing to the mutual connection between the first and second recesses 41 and 43, the second recess 43 can be prevented from shifting with respect to the first recess 41. This not only can enhance the mechanical strength of the grip portion but also can prevent a possibility that, when a load is applied to the grip portion and the grip portion is thereby strained, the first and second recesses 41 and 42 can rub against each other to thereby produce unpleasant noises.

Besides, as a connecting method for connecting together the first and second recesses 41 and 42, there are available, for example, mechanical connecting methods for using a fastening unit such as a securing projection and a securing hole for insertion of the securing projection or a screw or a pin, as well as joining methods using adhesives or by deposition.

According to the above aspects, even when the grip portion (first recess 41 and second recess 43) is strained in such a manner that it moves toward the image reading unit 20, it is surely possible to prevent the first recess 41 from touching the image reading unit 20. This makes it positively possible to prevent a possibility that the grip portion can flexed and the resultant strain of the grip portion can have an ill influence on the image reading unit 20.

The above aspects not only can reduce the number of parts used in the image forming apparatus and the number of steps for assembling the same but also can connect together the image forming unit 10 and image reading unit 20 using the cover member 42 which is an integral body with no juncture, whereby the image forming unit 10 and image reading unit 20 can be connected together strongly.

Further, according to the above aspects, since the image forming unit 10 and image reading unit 20 can be connected together using the cover member 42, which is an integral body with no juncture, there can be obtained an outer appearance shape, which is excellent in design.

What is claimed is:

1. An image forming apparatus comprising:
   an image forming unit that forms an image on a recording medium;

an image reading unit that reads an image on an original and is disposed upwardly of the image forming unit;

a joint member that connects the image forming unit and the image reading unit, a space being formed between the image forming unit and the image reading unit when the joint member connects the image forming unit and the image reading unit, the space configured to receive a recording medium discharged from the image forming unit, and the joint member further comprising:
- a first wall; and
- a second wall extending toward the space from the first wall,
- wherein the first wall and the second wall form a first recess; and a cover member, the cover member further comprising:
- a lower portion connected with the image forming unit;
- an upper portion extending toward the image reading unit, the upper portion covering at least the first recess; and
- a second recess formed in the upper portion so as to follow the shape of the first recess, wherein the first recess and the second recess cooperate to provide a grip portion that is configured to allow a user to carry the image forming apparatus.

2. The image forming apparatus according to claim 1, wherein:
the first recess is formed around a horizontal wall portion extending substantially in the horizontal direction; and
a periphery of the horizontal wall portion is integrally continuous with the joint member.

3. The image forming apparatus according to claim 2, wherein:
the horizontal wall portion is monolithically formed with the joint member.

4. The image forming apparatus according to claim 3, further comprising a space located between the horizontal wall portion and the image reading unit.

5. The image forming apparatus according to claim 1, further comprising a connecting unit that connects the first and second recesses.

6. The image forming apparatus according to claim 2, further comprising a space located between the horizontal wall portion and the image reading unit.

7. The image forming apparatus according to claim 2, further comprising a connecting unit that connects the first and second recesses.

8. The image forming apparatus according to claim 1, wherein the cover member comprises a printer cover that covers the image forming unit.

9. An image forming apparatus comprising:
an image forming means for forming an image on a recording medium;

an image reading means for reading an image on an original and being disposed upwardly of the image forming means;

a joint means for connecting the image forming means and the image reading means, a space being formed between the image forming means and the image reading means when the joint means connects the image forming means and the image reading means, the space configured to receive a recording medium discharged from the image forming means, and the joint means further comprising:
- a first wall; and
- a second wall extending toward the space from the first wall,
- wherein the first wall and the second wall form a first recess; and a cover means, the cover means further comprising:
- a lower portion connected with the image forming means;
- an upper portion extending toward the image reading means, the upper portion covering at least the first recess; and
- a second recess formed in the upper portion so as to follow the shape of the first recess, wherein the first recess and the second recess cooperate to provide a grip portion that is configured to allow a user to carry the image forming apparatus.

* * * * *